A. B. CHAPIN.
STRAINER.
APPLICATION FILED FEB. 21, 1913.
1,115,505.
Patented Nov. 3, 1914.
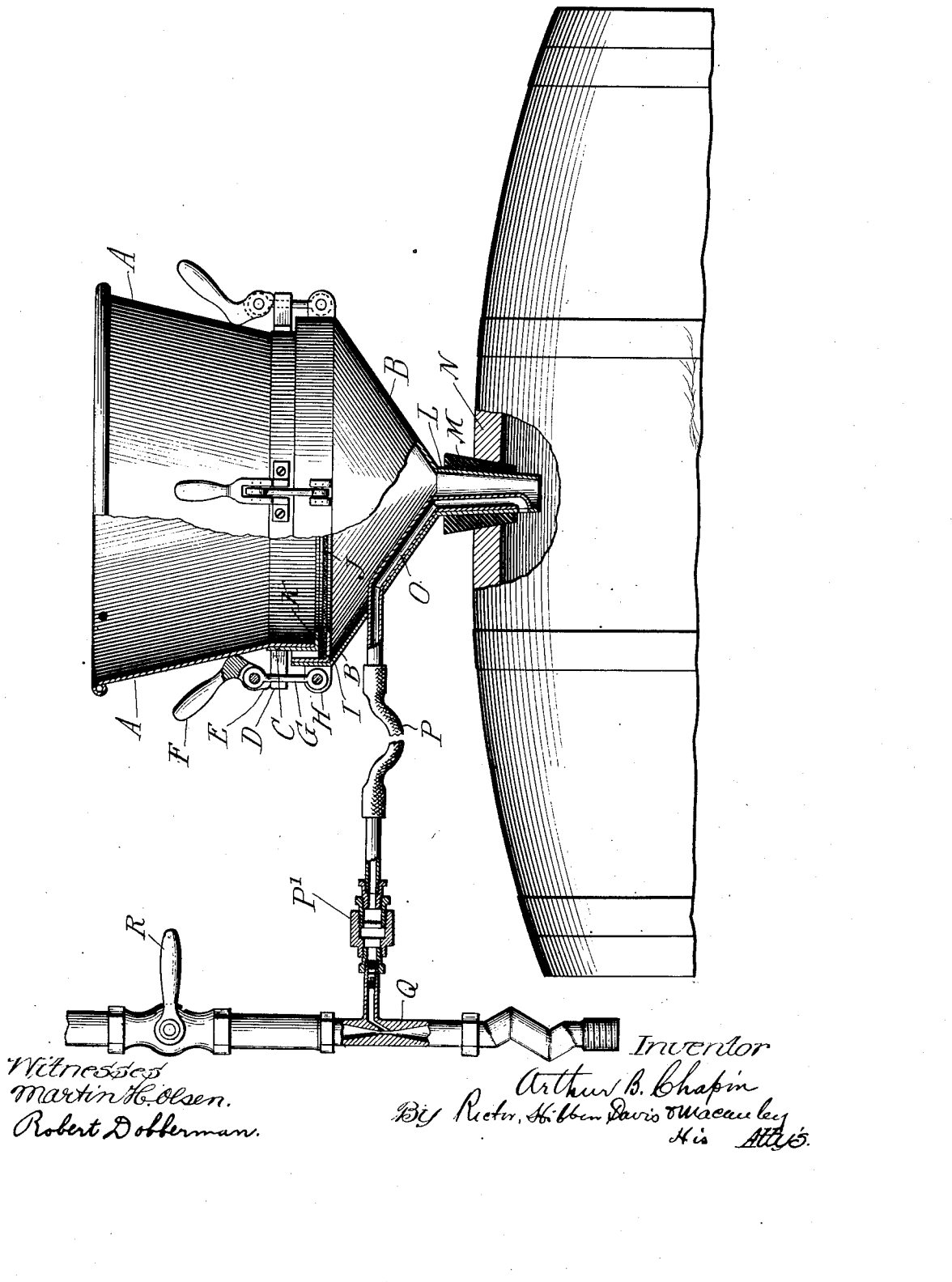
Witnesses
Martin H. Olsen.
Robert Dobberman.
Inventor
Arthur B. Chapin
By Rector, Hibben, Davis & Macauley
His Attys.

UNITED STATES PATENT OFFICE.

ARTHUR B. CHAPIN, OF CHICAGO, ILLINOIS, ASSIGNOR TO ARMSTRONG PAINT AND VARNISH WORKS, OF CHICAGO, ILLINOIS, A CORPORATION OF ILLINOIS.

STRAINER.

1,115,505.  Specification of Letters Patent.  Patented Nov. 3, 1914.

Application filed February 21, 1913. Serial No. 749,809.

*To all whom it may concern:*

Be it known that I, ARTHUR B. CHAPIN, a citizen of the United States, residing at Chicago, in the county of Cook and State of Illinois, have invented certain new and useful Improvements in Strainers, of which the following is a specification, reference being had to the accompanying drawings, forming part of this specification.
My invention relates to filtering apparatus in which the connection between the filter and the receptacle to be filled being sealed, suction or rarefaction of the atmosphere is induced within the receptacle, the preponderance of pressure thus caused on the surface of the liquid to be strained in the hopper of the filter producing a rapid and efficient filtering action.

The object of my invention is the production of a simple and efficient device of such character, self-contained or complete in itself and which is particularly adapted for use in straining paints, varnishes and like heavy liquids, although it is also adapted for a variety of other uses.

Its novelty consists in the particular construction and arrangement of the parts of the device, as hereinafter set forth and pointed out in the appended claims.
In the accompanying drawing I have shown, partly in elevation and partly in section, a strainer embodying my invention in a practical and desirable form, the construction and operation of which will now be described.

The upper hopper A of my improved strainer is detachably secured to the lower hopper B, and to that end may conveniently be formed with a reinforcing flanged band C to which are secured by screws, or in any suitable manner, a circumferential series of lugs D, in the present instance four in number, which lugs are engaged by cam members E, provided with handles F and pivoted to links G, such links being also pivotally mounted in lugs or ears H secured to the lower hopper B. Around the inside of the top of such lower hopper is soldered or otherwise suitably secured a flanged reinforcing band I, and between the flanges of the bands C and I are disposed the straining diaphragm J and a gasket K of rubber or other suitable material. It is apparent that with the construction described the handles F may be operated to clamp the diaphragm and gasket firmly between the flanges of the bands C and I, or release them for cleaning or replacement.

The conical lower hopper is extended at its base to form a tapering neck L, which is surrounded by the elastic bung M, preferably formed of rubber, and arranged to make air-tight engagement with the bung hole of the cask or barrel N which is to be filled. By this construction I attain a stable and air-tight engagement of the filter with the cask, no supporting legs or other supporting devices being required, and the bung hole being effectively sealed. A suction tube O extends through the side of the lower hopper downwardly from its point of entrance along the inner wall of such hopper and the inner wall of the neck L, opening through the lower part of the neck within the barrel. At its upper end a suction connection is made with such tube, such connection in the present instance comprising the tubing P a small strainer P' for removing such minute particles of paint as may happen to be drawn into the suction passage, and a suction fitting Q, operating to induce rarefaction in the tube O and consequently within the barrel by means either of a jet of water or of air or steam directed downwardly in a jet of high velocity past the angularly arranged orifice at the extremity of the passage connected with such tube O. An operating handle R is provided to govern the passage of fluid under pressure, from a source not shown, through the suction fitting Q.

I claim:

1. In apparatus of the character described, a hopper formed with a tapering depending neck arranged to extend within the bung hole of a receptacle, an elastic bung surrounding said neck and arranged to make sealed engagement with such bung hole, and a suction tube within said neck opening at its lower end below said bung and at a point above said bung adapted to be connected to exhausting means.

2. In apparatus of the character described, a hopper formed with a depending neck arranged to extend into the bung hole of a receptacle and make hermetically sealed engagement therewith, and a suction tube extending through the wall of said hopper and extending downwardly along the inner wall of said hopper and neck and opening laterally through said neck above the discharge orifice thereof into the interior of the receptacle.

3. In apparatus of the character described, a hopper formed with a tapering depending neck arranged to extend within the bung hole of a receptacle and make hermetically sealed engagement therewith, a suction tube within such neck adapted at its upper end to be connected to exhausting means and at its lower end extending laterally and opening into the interior of the receptacle outside the path of flow of contents passing through the neck of the hopper.

4. In apparatus of the character described, a hopper formed with a tapering depending neck arranged to extend into the bung hole of a receptacle, an elastic bung surrounding said neck and adapted to make sealed engagement with the bung hole of a receptacle, and a suction tube extending through the wall of said hopper and extending downwardly along the inner wall of said hopper and neck and opening into the receptacle below said bung.

5. In apparatus of the character described, an upper hopper, a collar secured to the lower edge of said hopper and having a horizontal flange projecting inwardly under the lower edge of the hopper, a flaring lower hopper having a depending neck, a ring seated within the top of said lower hopper and having an inwardly projecting horizontal flange lying beneath the flange of said collar, a strainer interposed between the flanges of said collar and said ring, means for clamping said hoppers together, and a suction tube extending through the wall of said lower hopper and downwardly through the neck thereof.

ARTHUR B. CHAPIN.

Witnesses:
Louis B. Erwin,
Robert Dobberman.